Figure 1:
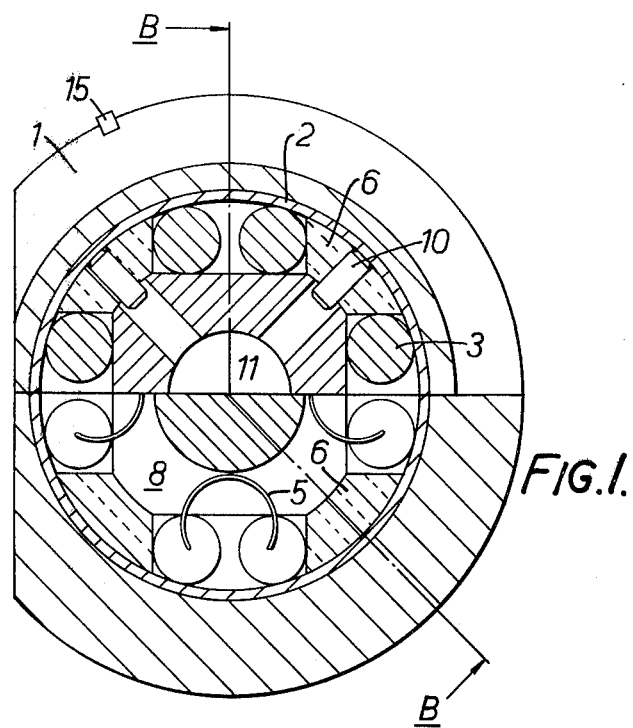

United States Patent [19]

Kellett et al.

[11] 4,177,887

[45] Dec. 11, 1979

[54] REVERSE SELF-LOCKING DEVICE

[75] Inventors: Harry Kellett, Dalton-in-Furness; Harold L. Searle, Barrow-in-Furness, both of England

[73] Assignee: Vickers Limited, London, England

[21] Appl. No.: 824,604

[22] Filed: Aug. 15, 1977

[51] Int. Cl.² ............................................. F16D 67/00
[52] U.S. Cl. ................................... 192/8 R; 188/82.84
[58] Field of Search .............. 192/8 R, 44; 188/82.84, 188/134

[56] References Cited

U.S. PATENT DOCUMENTS

| | | | |
|---|---|---|---|
| 2,449,020 | 9/1948 | Spraragen | 192/8 R |
| 2,493,272 | 1/1950 | Spraragen | 192/8 R |
| 2,787,353 | 4/1957 | Spraragen | 192/8 R |
| 2,812,044 | 11/1957 | Cole | 192/8 R |
| 3,243,023 | 3/1966 | Boyden | 192/8 R |
| 3,774,571 | 11/1973 | Shimanckas | 192/8 R |

FOREIGN PATENT DOCUMENTS 486425 9/1951 Italy ....................................... 188/82.84

Primary Examiner—Benjamin W. Wyche
Attorney, Agent, or Firm—Finnegan, Henderson, Farabow & Garrett

[57] ABSTRACT

A drive transmitting device is disclosed which may be preset and will subsequently become locked if sudden or gradual rotation forces are applied, the device comprising a first member at least part of which is inside a second member, a rotation of one of the members in either direction about an axis of rotation causing a rotation of the other member about the axis. There are rollers around the axis which co-operate with wedging surfaces in the device to prevent a rotation of the said one of the members from its preset position about the axis as a result of a rotation of the said other of the members in either direction about the axis, the rollers being arranged in respective pairs around the axis, the number of such pairs being more than two. The forces required to restrain rotation are shared substantially equally between respective rollers of the pairs.

3 Claims, 2 Drawing Figures

REVERSE SELF-LOCKING DEVICE

This invention relates to a drive transmitting device.

According to the invention there is provided a drive transmitting device which may be preset and will subsequently become locked if sudden or gradual rotation forces are applied, the device comprising a first member, a second member, at least part of the first member being inside the second member, a rotation of one of the members in either direction about an axis of rotation causing a rotation of the other member about the axis, rollers around the axis, and wedging surfaces in the device, the rollers co-operating with the wedging surfaces to prevent a rotation of the said one of the members from its preset position about the axis as a result of a rotation of the said other of the members in either direction about the axis, the rollers being arranged in respective pairs around the axis, the number of such pairs being more than two, the forces required to restrain rotation being shared substantially equally between respective rollers of the pairs.

Preferably the number of such pairs is four. The pairs of rollers are preferably arranged symmetrically around the axis.

There could be respective spring means between and acting to move apart the rollers of each of the pairs of rollers.

There could be pins around the axis and extending towards it, via which pins drive is transmitted from the said one of the members to the other of the members to rotate the latter in either direction about the axis.

Figure 2:
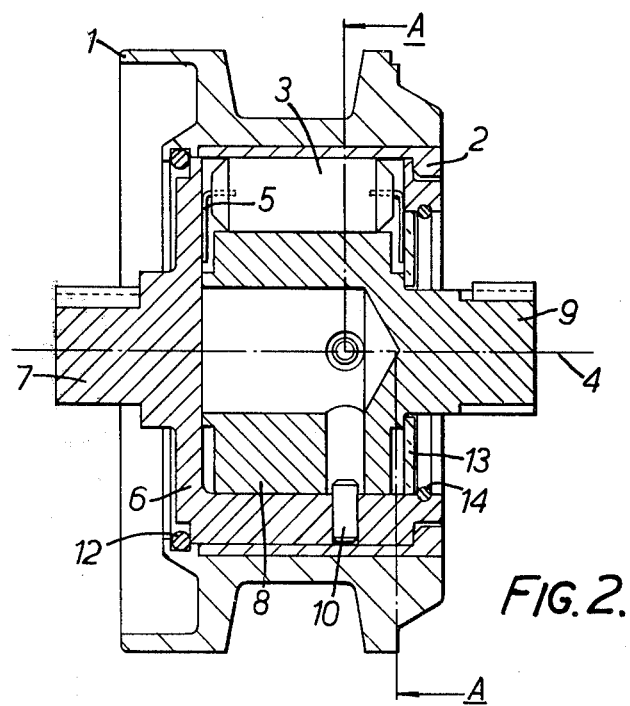

The invention will now be described by way of example with reference to the accompanying drawings, in which:

FIGS. 1 and 2 are transverse and longitudinal sections through a drive transmitting device, FIG. 1 being a section through A—A of FIG. 2 and the latter being a section through B—B of FIG. 1.

Inside a housing 1, prevented from rotating in use by a key 15, there is a sleeve 2 made from case hardened steel and acting as a bearing surface for four pairs of rollers 3 made from steel suitable for tool-pieces. The pairs of rollers 3 are symmetrically disposed about an axis of rotation 4 and the rollers of each pair are held apart by a respective pair of springs 5, one at each end of the pair. As shown in FIG. 2, the springs 5 have inturned ends which engage in axial bores in the rollers 3 at their axes of rotation so that the springs 5 act on the rollers 3 as close as possible to their axes of rotation.

The rollers are held in a cage 6 made of bronze and having an input 7 of the device, there being a spring ring 12 preventing cage 6 sliding out. The rollers of each pair also contact a respective one of four flat faces of a member 8 made from case hardened steel and having an output 9 of the device, there being a bearing thrust washer 13 prevented from sliding out by a spring ring 14 for retaining member 8. The input 7 and output 9 have key-ways in them, into which fit keys whereby the input can take up drive and the output can pass on drive. The cage 6 has four openings in it into which respective ones of steel pins 10 are tight fits, the pins extending towards the axis 4 and into respective ones of openings 11 in the member 8, which openings are wider than the pins. The angle between each one of the said four faces of the member 8 and a tangent to the sleeve 2 at its contact with either of the respective two rollers is 13¼°.

Operation of the device is as follows. If the input 7 is not rotated, the cage 6 is locked within the housing as a result of wedging of the rollers 3 between wedging surfaces provided by the inside of the sleeve 2 and the said faces of the member 8. If it is desired to rotate the output 9 about the axis 4, then the input 7 is rotated in the appropriate direction, appropriate ones of the rollers 3 being pushed by the cage 6 out of their locking positions and the others of the rollers rolling along the inside surface of the sleeve 2 and out of their locking positions. Thus considering FIG. 1, if the cage 6 is rotated in a clockwise direction, then for example the left-hand one of the upper pair of rollers 3 is pushed out of its locking position and the right-hand one rolls along the inside surface of the sleeve 2, rotation of the cage 6 having allowed it to come out of its locking position. Eventually, the pins 10 contact the sides of the openings 11 and drive is transmitted to the member 8 so that the output 9 rotates about the axis 4. Any tendency of the output 9 to drive the input (either with the input stationary or causing drive of the output) by trying to rotate in either direction relative to the input, is prevented by the locking actions of appropriate ones of the rollers 3 between the wedging surfaces provided by the inside of the sleeve 2 and the said faces of the member 8. Thus considering FIG. 1, if the cage 6 is stationary and the member 8 tries to drive it in a clockwise direction, this is prevented by the locking of the rollers such as the left-hand one of the upper pair of rollers between the said faces of the member 8 and the inside of the sleeve 2.

An application of the device described above is in the elevating or traversing gearing of a gun, the input 7 being coupled with a turning handle and the output 9 with the gun barrel, the arrangement being such that the handle can be used to elevate or traverse the gun as the case may be but if the gun barrel, as a result of firing the gun, tries to drive the handle, then this is prevented. The reaction forces arising from the firing of a gun impose very high shock loadings on the elevating or traversing gear. In order to lock such elevating or traversing gear against these high shock loadings, the device is incorporated into the elevating or traversing gear. When the gun is fired, the shock reaction loadings will cause four of rollers 3 to wedge between member 8 and the inside surface of sleeve 2 if the direction of the imposed reaction is clockwise; if the direction of the imposed reaction is anti-clockwise, then the other roller 3 of each of the four pairs will similarly wedge between member 8 and the inside surface of sleeve 2. Because of the magnitude of the reaction forces due to the firing of a gun and the rapidity with which they are exerted, it is essential that there should be an efficient means of sharing such reaction forces. In device, the means of locking and sharing these reaction forces is accomplished by the four pairs of rollers 3, in conjunction with the wedging surfaces provided by member 8 and the inside surface of sleeve 2.

We claim:

1. A drive transmitting device for use with a gun, which device may be preset and which will subsequently become locked if sudden or gradual rotation forces are applied, said device comprising:

a first member;

a second member, at least part of said first member being inside said second member;

means interposed between said first and second members whereby rotation of one of said members in either direction about a first axis of rotation causes rotation of said other member about said axis in the same direction as said one member, and whereby rotation of said one member about said first axis from its preset position as a result of rotation of said other member in either direction about said first axis is prevented, said means including a cylindrical housing coaxial with said first axis and extending around said second member, a plurality of rollers each having an axis of rotation spaced from said first axis and being arranged in respective pairs around said first axis, the number of pairs of rollers being more than two, spring means biasing the rollers of each pair of rollers away from each other, said spring means engaging with each of said rollers as close as possible to their axes of rotation and allowing free rolling movement of each of said rollers, said spring means comprising a separate spring for each said pair of rollers, each spring comprising a U-shaped resilient body extending radially inwardly from a respective pair of said rollers and having end portions which extend axially into central bores of said respective pair of rollers, wedging surfaces for said rollers defined by a flat outer surface on said first member for each respective pair of rollers and an internal cylindrical surface of said housing, said rollers cooperating with said wedging surfaces to prevent rotation of said one member from its preset position about said first axis as a result of rotation of said other member in either direction about said first axis, the forces required to restrain rotation of said one member being shared substantially equally between respective rollers of each of said pairs.

2. A drive transmitting device as claimed in claim 1, said rollers and wedging surfaces being disposed so that the angle between each of the flat surfaces of said first member and a tangent to the internal surface of said housing at a point where a roller engaging said flat surface engages said housing internal surface is $13\frac{1}{2}°$.

3. A drive transmitting device as claimed in claim 1, said rollers including four pairs of rollers arranged symmetrically around said first axis.

* * * * *